Dec. 1, 1925.　　　　　　　　　　　　　　　　　1,563,807
I. K. TUERCK
GEAR SHIFTING AND CAR LOCKING MECHANISM FOR MOTOR VEHICLES
Filed July 14, 1924　　　2 Sheets-Sheet 1
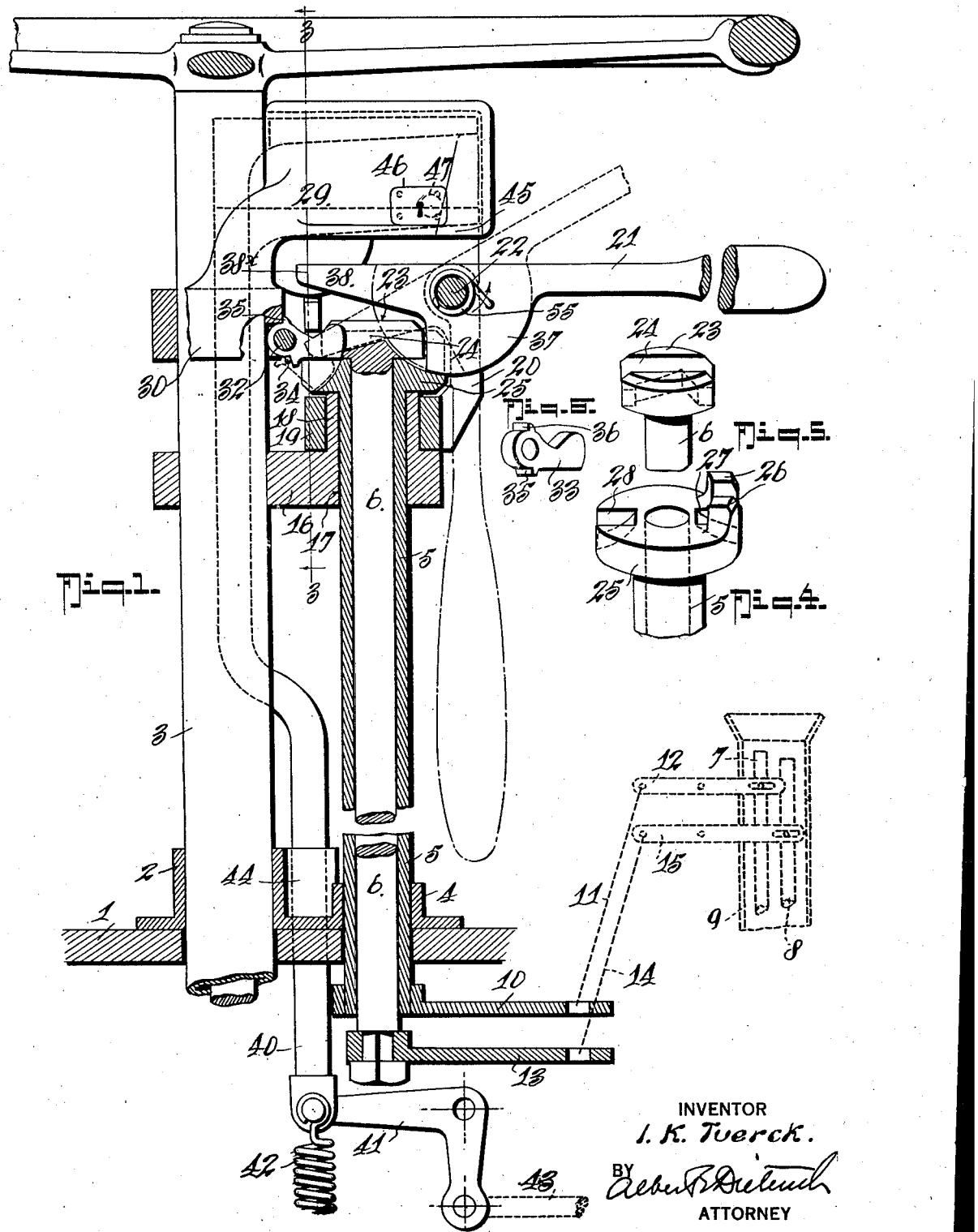
INVENTOR
I. K. Tuerck.
BY
ATTORNEY Dec. 1, 1925.                                          1,563,807
I. K. TUERCK
GEAR SHIFTING AND CAR LOCKING MECHANISM FOR MOTOR VEHICLES
Filed July 14, 1924         2 Sheets-Sheet 2
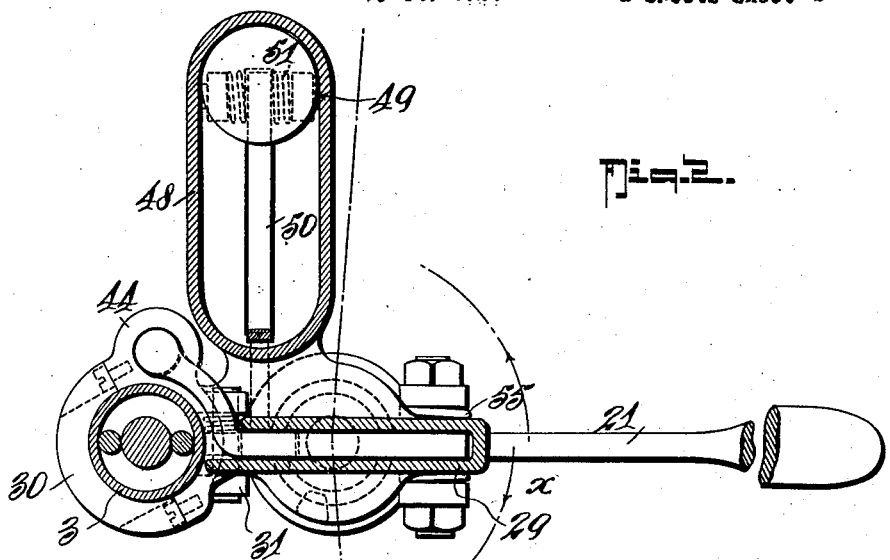
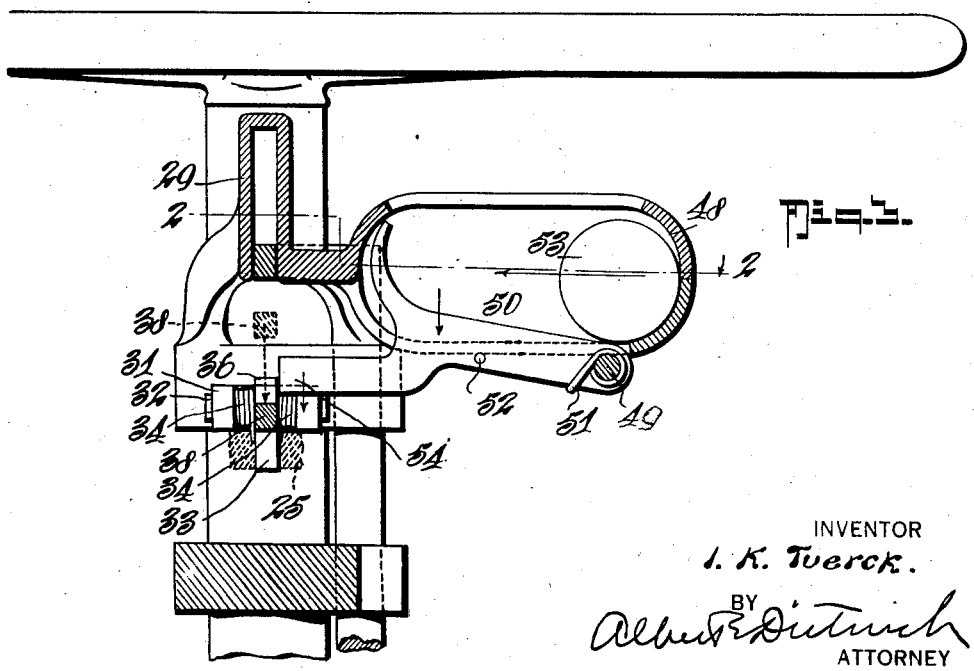
INVENTOR
I. K. Tuerck.
BY
Albert E Dietrich
ATTORNEY Patented Dec. 1, 1925.

1,563,807

UNITED STATES PATENT OFFICE.

IOHAN KONRAD TUERCK, OF PORTLAND, OREGON.

GEAR-SHIFTING AND CAR-LOCKING MECHANISM FOR MOTOR VEHICLES.

Application filed July 14, 1924. Serial No. 726,038.

*To all whom it may concern:*

Be it known that I, IOHAN KONRAD TUERCK, a citizen of the United States, a resident of Portland, in the county of Multnomah and State of Oregon, have invented certain new and useful Improvements in Gear-Shifting and Car-Locking Mechanism for Motor Vehicles, of which the following is a specification.

My present invention relates to the art of motor vehicles. Such vehicles are usually provided with sliding gear transmissions, emergency brakes, and a suitable steering mechanism including a steering post tube. The general practice at the present day in automobile engineering is to provide a lever for effecting the selective shifting of the gears, which lever is usually located adjacent to the emergency brake lever at the driver's right and projects up through the floor board of the car. In bringing a car to a standstill it is the practice to shift the gears to a neutral position, and if the car is to be parked to then apply the emergency brake. This makes two operations, one the gear shift to neutral and the other the application of the emergency brake.

One of the objects of the present invention is to provide a means whereby the usual brake lever, the usual emergency shift lever and the usual gear shift lever may be, if desired, dispensed with entirely, and a gear shifting lever provided which may be used not only to hold the gear shifting mechanism secured in the neutral position or to shift such gear, but it may be used at the same time to set and hold the emergency brake.

A further object of the invention is to combine with this gear shifting and brake applying lever, a locking device by which, once the lever is set to secure the gears in neutral and to apply the emergency brake, the said lever itself be locked against movement, thereby effectively locking the machine against unauthorized use.

Again my invention has for an object to provide mechanism whereby the gears can not be thrown into the reverse while the machine is ascending a grade, the action being wholly automatic.

My invention also has for an object to provide such mechanism as above outlined that can be mounted on the steering tube beneath the steering wheel in a convenient and easily accessible place so that the shifting of the gears, etc., may be effected by the operator without the necessity of him reaching over to grasp the long gear shifting lever now commonly employed in automobiles.

In its general nature the invention comprises a pair of selector shafts, journaled in suitable bearings adjacent the steering post tube, a selecting and operating lever tube mounted on the steering post tube beneath the steering wheel, such lever having movement so that it may be brought into cooperation with either selector shaft to turn the same; there is provided means associated with the lever and connected with the emergency brake by which, on moving the lever to a certain position, the emergency brake will be applied and held applied; the invention also provides means whereby when the operating lever is moved to apply the brake it will at the same time become interlocked with the selective shafts and hold them both against turning; a catch is furthermore provided to hold automatically the unselected shaft against turning while the selected shaft is being manipulated.

The invention further provides means, automatically controlled, to prevent the selecting and operating lever being moved to the reverse position while the car is on the up-grade.

In its more detailed nature, the invention also embodies those novel features of construction, combination and arrangement of parts, all of which will be first fully described, then be specifically pointed out in the appended claims and illustrated in the accompanying drawings, in which:

Figure 1 is an elevation and part section showing my invention as mounted on a steering post tube.

Figure 2 is a horizontal section on substantially the line 2—2 of Figure 1.

Figure 3 is a vertical section taken substantially on the line 3—3 on Figure 1.

Figure 4 is a detail perspective view of a portion of one of the shifting elements and its head.

Figure 5 is a detail perspective view of a portion of the other shifting element and its head.

Figure 6 is a detail perspective view of the wing latch.

Figure 7 is a detail horizontal section illustrating the operating lever locked to the emergency actuating position indicated in dot and dash lines in Figure 1.

In the drawings, in which I have illustrated one embodiment only of my invention, like numerals and letters of reference indicate like parts in all the figures.

1 represents the base or support for the steering post tube socket member 2 in which the steering post tube 3 is supported in the usual manner. Another socket member 4 serves as one of the bearings for the gear shifting elements 5 and 6 by which the shifting rods 7 and 8 located in the transmission gear box 9 are actuated through suitable lever and rod connections 10, 11, 12, 13, 14 and 15 respectively.

In the drawings I have but diagrammatically indicated the parts 7 to 15 inclusive as they may be of any desired form or construction which will serve the intended purpose, and as they per se constitute no part of my present invention, more detailed illustration thereof is thought to be unnecessary.

The gear shifting elements 5 and 6, preferably, consist of two shafts, one, 5, being hollow and the other, 6, being located within the shaft 5. At the upper extremities the shafts 5 and 6 are supported by a bracket 16 which is secured in any suitable way to the tube 3 and has a bearing 17 for the shaft 5. The bracket 16 also is provided with a bearing sleeve 18 on which the selecting and operating lever's bracket member 19 is swivelly mounted.

The bracket 19 has projections 20 which are spaced apart to receive the selecting and operating lever 21, the latter being pivoted to the bracket projections 20 at 22.

The shaft 5 has a head 23 that is provided with a cross slot 24 while the shaft 6 has a head 25 with spaced ears 26 and a slot 27 between them. It also has a slot 28 diametrically opposite to the slot 27 for a purpose presently understood.

29 is a housing which is secured at 30 to the tube 3. 31 designates ears in which a latch pin 32 is mounted, the pin 32 carrying a latch wing 33 that is normally held in the slot 24 of the head 23 by a spring 34, suitably located stops 35 and 35 located on the support and on the latch wing respectively, serving to limit the movement of the latch wing.

The operating lever 21 has an arcuate heel 37 adapted to cooperate with the slot and lug 27 and 26 and with the slot 24. It also has a finger 38 adapted to cooperate with the slot 24 and with the latch wing 33. It also is adapted to cooperate with the lifting finger 39 of the rod 40 which, when the rod 40 is raised, rocks the bell crank 41 against the tension of the release spring 42 to pull the rod 40 that sets the emergency brake (not shown and which may be of the usual construction). The rod 40 is mounted in suitable guides 44 and the housing 29 is slotted to permit the finger 39 to lie within the housing at all times.

The housing has a slot 45 through which the finger 38 of the lever 21 can pass to engage the finger 39 and effect the raising and lowering of the rod 40.

It will be observed that when the lever 21 is in the fully lowered position (see dot and dash line, Figure 1) it will be located at right angles to the finger 39 and thus act as an abutment to hold the rod 40 elevated and the emergency brake applied.

In order to lock the lever 21 in the position shown in dot and dash lines in Figure 1 and thereby lock the machine,—i. e., lock the emergency brake and lock the shafts 5 and 6,—I provide a suitable locking device 46 (the specific construction of which, so far as my present invention is concerned, is not material) having a bolt or lug 47 that can be brought into and out of the path of the finger 38 so as to secure it, when desired, in the dot and dash position, see Figure 7.

In order to prevent the accidental shifting of the gears to the "reverse" when ascending a more or less steep grade, I provide a housing extension 48 to which is pivoted at 49 a trigger-like lever 50, the housing being slotted to permit the lever 50 to project into the housing.

A spring 51 serves normally to hold the lever 50 in the raised position, the lifting movement being limited by a stop 52.

Within the casing 48 is a ball 53 and the housing is so located with respect to the horizontal plane that with the vehicle running on the level (or on a slight up-grade) the ball will be located at the outer end of the casing and will not affect the position of the lever 50. When the vehicle is on an upgrade of such pitch as may be decided upon, the ball 53 will run back and depress the lever 50 to bring its end 54 into the path of the end 38× of the finger 38 of the lever 21, thus preventing the lever 21 from being swung in the direction of the arrow x in Figure 2 (the "reverse" position).

*Operation.*

Assume the parts to be located as shown in the dot and dash line in Figure 2. In this position the shafts 5 and 6 will be locked against turning by the arcuate heel 37 which at this time is located in the slots 27 and 24 and between the ears 26 and which also is holding up the finger 39 of the brake applying rod 40.

Now should it be desired to proceed with the running of the vehicle the lock 46 is manipulated to withdraw the locking pin 47 so as to leave the lever 21 free to be rocked on its horizontal axis 22 from the position shown in dot and dash lines in Figure 1 to the position shown in dotted lines in Figure 1. In moving to the dotted line position of Figure 1 the finger 38 of the lever 21 becomes located in the slot 24 while the heel 37 is withdrawn from between the slots 24 and 27 and from between the ears 26. As the finger 38 enters the slot 24 its end will engage the wing latch 33 and depress it from its position in the slot 24 down into the slot 28, in which position it is held by the finger 38 until the shaft 6 is turned somewhat so that the head 23 lies over the latch 33, at which time the head 23 serves to hold the latch 33 down in the slot 28.

When the lever 21 has been moved to the dotted line position of Figure 1 it will be noted it is operatively connected with the head 23 and may be turned upwardly or backwardly on the axis of the shaft 6. If turned in one direction the shaft 6 is operated through the intermediate connections to effect the throwing in of the reverse gear. If moved in the opposite direction the "first" gear is brought into mesh. In order to shift into the second and third gears the lever 21 is moved to the full line position of Figure 1, at which it will be seen the heel 37 again enters between the lugs 26 in the slot 27 while the finger 38 rides out of the slot 24. If this occurs, the slots 24 and 28 are again in alignment, the wing latch 33 is raised by spring action back again into the slot 24 to hold the shaft 6 stationary. Now the lever 21 is connected up with the shaft 5 and by moving the lever 21 forwardly or backwardly, either the second or high (third) gear is brought into position.

As before explained if the lever 21 is in the dotted position shown in Figure 1 and the car is travelling up a steep (more or less) grade, and an attempt is made to move the lever 21 so as to throw in the reverse gear it will be found that the lever 50 has been dropped to bring its end 54 into the path of the end 38× of the finger 38 and such movement of the lever 21 will be arrested, thus making it impossible to throw in the reverse gear when it should not be done.

In order to hold the lever 21 from dropping down I may provide a suitable counterbalance spring 55 which will be of sufficient tension to overcome the weight of the lever and tend to hold it in the elevated position.

From the foregoing description, taken in connection with the accompanying drawings, it is thought that the construction, operation and advantages of my invention will be clear to those skilled in the art, and I desire it understood that I have illustrated in these drawings but one embodiment of my invention and that changes in the details of construction, combination and arrangement of parts, etc., may be made within the scope of the invention and that of the appended claims.

What I claim is:

1. In apparatus of the class described, the combination with a plurality of gear selecting shafts, a shifting lever adapted to selectively operate said shafts, means to hold the shaft not selected against action during operation of the selected shaft, and means restraining said lever against moving one of said shafts in one of two directions when the apparatus as a whole is located at a predetermined inclination to the horizontal.

2. In apparatus of the class described, the combination of a pair of sliding-gear-transmission-selector-shafts, an emergency-brake-operating-rod, a mechanism for selectively operating said shafts for holding the same against action and effecting brake applying movement of said operating rod, said mechanism including a single lever and means by which said lever may be brought into operative relation either with said emergency brake operating rod or said sliding-gear-transmission-selector-shafts alternately to operate the same accordingly as said lever is moved to one position or another.

3. In apparatus of the class described, the combination of a pair of slidable-gear-transmission-selector-shafts, an emergency-brake-operating-rod, a mechanism for selectively operating said shafts for holding the same against action and effecting brake applying movement of said operating rod, said mechanism including a single lever and means by which said lever may be brought into operative relation either with said emergency brake operating rod or said sliding-gear-transmission-selector-shafts alternately to operate the same accordingly as said lever is moved to one position or another, and means for locking the said lever in a position to hold said shafts against action and said brake-operating-rod in the brake-applying position.

4. In a motor vehicle wherein is provided a sliding gear transmission of the selective type employing a plurality of shifting elements, and wherein is provided an emergency brake mechanism to hold the vehicle at rest; the combination of a single gear shifting and emergency brake applying lever with means connecting said lever with said shifting elements and with said brake mechanism whereby said lever may be used to shift said elements or operate said emergency brake as the lever is in one position or another, and locking mechanism adapted to hold said lever in a position to retain said shifting elements in a neutral or inoperative relation and to hold said emergency brake in the applied position substantially as shown and described.

5. In apparatus of the class described, the combination with gear shifting elements, and an emergency brake applying element of a motor vehicle or the like, a single gear selecting and emergency brake applying lever, means cooperatively associating said lever with both said shifting elements and with said brake applying element in virtue of which said lever may be manipulated for operating said shifting elements or actuating said brake applying lever and holding the same applied and including means for holding said shifting elements against movement, accordingly as said lever is in one position or another, and a locking device for securing said lever in a fixed position.

6. In a motor vehicle wherein is provided a sliding gear transmission of the selective type employing a plurality of shifting elements and wherein is provided an emergency brake mechanism to hold the vehicle at rest; a single gear shifting and emergency brake applying lever, operative connections between said lever and said shifting elements and between said lever and said brake, and a lock device cooperative with said lever for locking said emergency brake in the applied position and said shifting elements against movement.

7. In a motor vehicle wherein is provided a sliding gear transmission of the selective type employing a plurality of shifting elements and wherein is provided an emergency brake mechanism to hold the vehicle at rest; a single gear shifting and emergency brake applying lever, operative connections between said lever and said shifting elements and between said lever and said brake, and means to lock said shifting elements in a neutral position and at the same time hold said emergency brake applied.

8. In a motor vehicle wherein is provided a sliding gear transmission, a steering wheel, an emergency brake; gear shifting elements and a brake applying element mounted adjacent to said wheel, a selecting and gear-shift-element-operating lever also mounted adjacent said wheel for selectively operating one or another of said gear shifting elements accordingly as said lever is in one position or another, and means whereby said lever may be moved to hold said shifting element inactive and apply said emergency brake.

9. In a motor vehicle wherein is provided a sliding gear transmission, a steering wheel, an emergency brake; gear shifting elements and a brake applying element mounted adjacent to said wheel, a selecting and gear-shift-element-operating lever also mounted adjacent said wheel for selectively operating one or another of said gear shifting elements accordingly as said lever is in one position or another, and means whereby said lever may be moved to hold said shifting element inactive and apply said emergency brake, said means comprising a locking element on said lever to engage cooperating elements in said shifting elements and including a portion to engage and move said brake applying element when said lever is moved to a predetermined position.

10. In a motor vehicle wherein is provided a sliding gear transmission, a steering wheel, an emergency brake; gear shifting elements and a brake applying element mounted adjacent to said wheel, a selecting and gear-shift-element-operating lever also mounted adjacent said wheel for selectively operating one or another of said gear shifting elements accordingly as said lever is in one position or another, and means whereby said lever may be moved to hold said shifting element inactive and apply said emergency brake, said means including mechanism for preventing said lever from operating said brake applying element until said shifting elements are brought to a neutral position.

11. In motor vehicles wherein is provided a selective gear transmission and a steering post tube; a pair of gear shifting shafts mounted adjacent to said tube, one of said shafts turning within the other, each of said shafts having heads provided with slots, a pivotally and swivelly mounted selecting and operating lever associated with said shaft heads and having portions adapted alternately to enter the slots of the respective heads to connect the lever with one or the other of said heads, and means for holding the unconnected head against movement when the lever is turned to move the connected head, substantially as described.

12. In motor vehicles wherein is provided a selective gear transmission and a steering post tube; a pair of gear shifting shafts mounted adjacent to said tube, one of said shafts turning within the other, each of said shafts having heads provided with slots, a pivotally and swivelly mounted selecting and operating lever associated with said shaft heads and having portions adapted alternately to enter the slots of the respective heads to connect the lever with one or the other of said heads, and means for holding the unconnected head against movement when the lever is turned to move the connected head, said last named means including a latch device to enter the respective slots of the heads, means continuously tending to hold said latch device in the slot of one head, said latch device adapted to be engaged by the lever to move it into the slot of the other head at times, substantially as specified.

13. In motor vehicles wherein is provided a selective gear transmission and a steering post tube; a pair of gear shifting shafts mounted adjacent to said tube, one of said shafts turning within the other, each of said shafts having heads provided with slots, a pivotally and swivelly mounted selecting and operating lever associated with said shaft heads and having portions adapted alternately to enter the slots of the respective heads to connect the lever with one or the other of said heads, and means for holding the unconnected head against movement when the lever is turned to move the connected head, said last named means including a latch device to enter the respective slots of the heads, means continuously tending to hold said latch device in the slot of one head, said latch device adapted to be engaged by the lever to move it into the slot of the other head at times, an emergency brake shifting rod with which said lever is adapted to cooperate to apply the emergency brake when said lever is in a predetermined position, said lever having provision to enter the slots of both heads when in the emergency brake applying position thereby to hold said heads against turning when the brake is applied.

14. In motor vehicles wherein is provided a selective gear transmission and a steering post tube; a pair of gear shifting shafts mounted adjacent to said tube, one of said shafts turning within the other, each of said shafts having heads provided with slots, a pivotally and swivelly mounted selecting and operating lever associated with said shaft heads and having portions adapted alternately to enter the slots of the respective heads to connect the lever with one or the other of said heads, and means for holding the unconnected head against movement when the lever is turned to move the connected head, said last named means including a latch device to enter the respective slots of the heads, means continuously tending to hold said latch device in the slot of one head, said latch device adapted to be engaged by the lever to move it into the slot of the other head at times, an emergency brake shifting rod with which said lever is adapted to cooperate to apply the emergency brake when said lever is in a predetermined position, said lever having provision to enter the slots of both heads when in the emergency brake applying position thereby to hold said heads against turning when the brake is applied, and a lock device for holding the lever in said last named position.

15. In apparatus of the class described, the combination with a plurality of gear selecting shafts, a shifting lever adapted to selectively operate said shafts, means to hold the shaft not selected against action during operation of the selected shaft, and means restraining said lever against moving one of said shafts in one of two directions when the apparatus as a whole is located at a predetermined inclination to the horizontal, said restraining means comprising a gravity controlled stop device adapted to be projected into the path of said shifting lever when the apparatus as a whole is inclined as stated.

16. In apparatus of the class described, the combination with a plurality of gear selecting shafts, a shifting lever adapted to selectively operate said shafts, means to hold the shaft not selected against action during operation of the selected shaft, and means restraining said lever against moving one of said shafts in one of two directions when the apparatus as a whole is located at a predetermined inclination to the horizontal, said restraining means comprising a pivoted stop, means normally holding said stop out of the path of movement of said shifting lever, and a shifting ball device governed by the position of the apparatus as a whole for moving said stop into the path of said shifting lever at times.

IOHAN KONRAD TUERCK.